(12) United States Patent
Wakamizu et al.

(10) Patent No.: US 7,936,525 B2
(45) Date of Patent: May 3, 2011

(54) DRIVING APPARATUS, LENS BARREL AND CAMERA

(75) Inventors: Yoh Wakamizu, Yokohama (JP); Hitoshi Nishimoto, Yokohama (JP)

(73) Assignee: Nikon Corporation, Tokyo (JP)

( * ) Notice: Subject to any disclaimer, the term of this patent is extended or adjusted under 35 U.S.C. 154(b) by 203 days.

(21) Appl. No.: 12/068,666

(22) Filed: Feb. 8, 2008

(65) Prior Publication Data

US 2008/0198486 A1 Aug. 21, 2008

(30) Foreign Application Priority Data

Feb. 16, 2007 (JP) ................................. 2007-036986

(51) Int. Cl.
*G02B 7/02* (2006.01)
(52) U.S. Cl. ........................................ 359/823; 359/811
(58) Field of Classification Search ............ 359/811–824
See application file for complete search history.

(56) References Cited

U.S. PATENT DOCUMENTS

| | | | | |
|---|---|---|---|---|
| 5,748,394 | A | * | 5/1998 | Shimazaki et al. ............ 359/823 |
| 2002/0093629 | A1 | | 7/2002 | Watanabe ...................... 353/101 |

FOREIGN PATENT DOCUMENTS

| | | |
|---|---|---|
| JP | 4-141611 | 5/1992 |
| JP | 8-248284 | 9/1996 |
| JP | 2004-205556 | 7/2004 |

OTHER PUBLICATIONS

Extended European Search Report, mailed Jul. 1, 2008, issued in corresponding European Patent Application No. 08101533.1-1240.

* cited by examiner

*Primary Examiner* — David N Spector
*Assistant Examiner* — Brandi N Thomas

(57) ABSTRACT

A driving apparatus of the present invention comprises: a lead screw which rotationally drives; and a follower section to hold a driven member L and to rectilinearly move based on rotation of the lead screw. The follower section comprises a first tooth and a second tooth that faced a side portion of the lead screw and are opposite to each other and a third tooth provided in a position different from those of the first tooth and the second tooth. When the follower section rectilinearly moves based on the rotation of the lead screw, power is transferred with the lead screw and the first tooth being engaged with each other, and the lead screw is in a non-contact state with the second tooth and the third tooth.

17 Claims, 7 Drawing Sheets

DRIVING APPARATUS, LENS BARREL AND CAMERA

The disclosure of the following priority application is herein incorporated by reference: Japanese Patent Application No. 2007-036986 filed on Feb. 16, 2007.

BACKGROUND OF THE INVENTION

1. Field of the Invention

The present invention relates to a driving apparatus for driving a driven member, and a lens barrel and a camera whose lens is driven by the driving apparatus.

2. Description of the Related Art

In the prior art, as a driving apparatus for driving a lens of a camera, there is an apparatus provided with a lead screw for rotational driving, and a lens holding section that holds a lens and is coupled with a nut member moving rectilinearly based on the rotation of the lead screw in meshing engagement with the lead screw (for example, see Japanese Unexamined Patent Application Publication No. 2004-205556).

However, the structure using a nut member may cause the nut member and the lead screw to jam, for example if the rotation of the lead screw is not halted for some reason when the lens holding section reaches an end of the driving apparatus. To avoid this jamming together, there is a structure using a rack member whose engagement teeth are provided on only one face thereof instead of the nut member, but this structure leads to the problem that tooth skipping can be easily caused by shocks.

SUMMARY OF THE INVENTION

An object of the present invention is to provide a driving apparatus, a lens barrel and a camera, wherein jamming into the lead screw and the tooth skipping do not readily occur.

A first aspect of the invention is to provide a driving apparatus, comprising: a lead screw which rotationally drives; and a follower section to hold a driven member and to rectilinearly move based on rotation of the lead screw, wherein the follower section has a first tooth and a second tooth that face a side portion of the lead screw and are opposite to each other and a third tooth provided in a position different from that of the first tooth and the second tooth, and when the follower section rectilinearly moves based on the rotation of the lead screw, power is transferred with the lead screw and the first tooth being engaged with each other, and the lead screw is in a non-contact state with the second tooth and the third tooth.

The first tooth and the third tooth may be provided at positions apart from each other by about 90 degrees about a rotary axis line of the lead screw.

The third tooth may be provided at a position closer to the driven member than the first tooth and the second tooth.

The follower section may have an inner-peripheral surface surrounding the side portion of the lead screw in a state that a part of the side portion is opened, and the first tooth, the second tooth and the third tooth may be formed on the inner-peripheral surface, the third tooth being provided at one side in a direction of the rotary axis line of the lead screw on the inner-peripheral surface.

A butt-contact section may be provided on a stationary part that does not move when the lead screw drives the driven member, and movement of the follower section along the lead screw may be limited at an end of a movable range of the follower section with the follower section being in butt-contact with the butt-contact section.

There may be provided a butt-contact section provided on a stationary part that does not move when the lead screw drives the driven member, which is intended to be in butt-contact with a portion of the follower section that is situated on an other side opposite to the one side on which the third tooth is provided and that is situated on a side opposite to the third tooth across the rotary axis line of the lead screw, and movement of the follower section along the lead screw may be limited in an end of a movable range of the follower section with the portion of the follower section being in butt-contact with the butt-contact section.

The driving apparatus may further comprise a biasing member to press the first teeth towards the lead screw.

A second aspect of the present invention is a lens barrel which drives a lens using the above mentioned driving apparatus.

A third aspect of the present invention is a camera which drives a lens using the above mentioned driving apparatus.

According to the present invention, it is possible to provide a driving apparatus, a lens barrel and a camera, wherein jamming into the lead screw and the tooth skipping do not readily occur.

DETAILED DESCRIPTION OF THE PREFERRED EMBODIMENT

Now, an explanation will be given concerning a lens driving apparatus 1 of an embodiment of the present invention with reference to the drawings. It should be noted that the description is made with respect to the lens driving apparatus 1 in an AF (Auto Focus) digital camera in the present embodiment, but the present invention is not limited to this type, and is applicable to various kinds of cameras including a video camera and so on.

Figure 1:
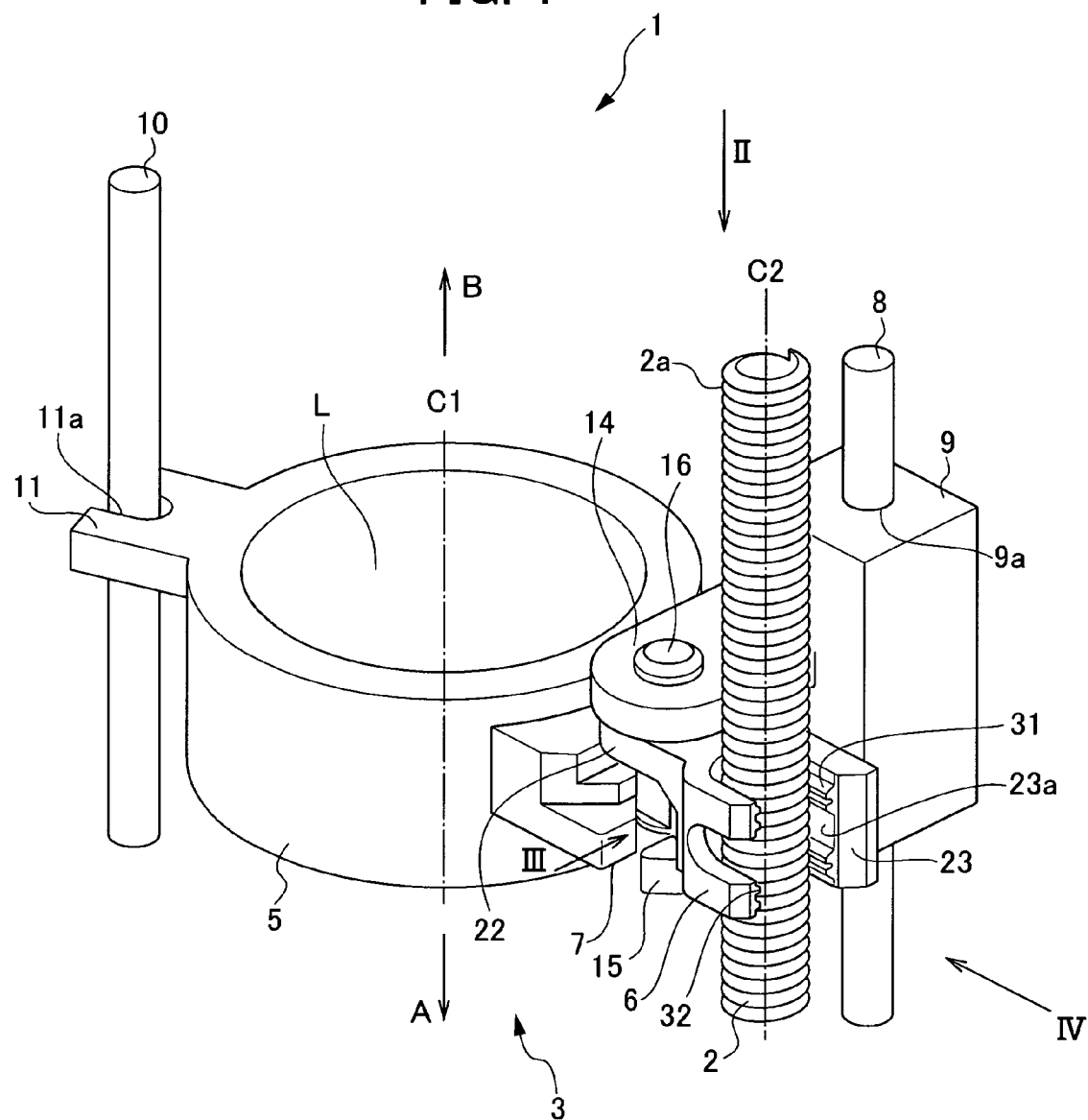
FIG. 1 is a perspective view of a lens driving apparatus.

FIG. 1 is a perspective view of the lens driving apparatus 1. The lens driving apparatus 1 is provided with a lead screw 2 that rotary drives, and a follower section 3 that holds a lens L and gears with the lead screw 2.

The lead screw 2 rotationally drives based on the torque transferred from a stepping motor, a DC motor or the like that is a drive source. Threads 2a are provided on a side portion of the lead screw 2.

The follower section 3 is provided with a lens holding section 5 for holing the lens L, an arm section 6 engaged with the lead screw 2, a coupling section 7 for coupling the lens holding section 5 with the arm section 6, a first shaft holding section 9 attached to the coupling section 7, into which a first guide shaft 8 is inserted, a second shaft holding section 11 attached to the lens holding section 5, into which a second guide shaft 10 is inserted.

The lens holding section 5 is a substantially cylindrical part inside which the lens L is mounted. The optical axis C1 of the lens L mounted in the lens holding section 5 is parallel to the rotary axis line C2 of the lead screw 2.

The first shaft holding section 9 is a rectangular part continuous with the coupling section 7 as described above. The first shaft holding section 9 is provided with a through-hole 9a parallel with the rotary axis line C2 of the lead screw 2, and the first guide shaft 8 extending parallel with the rotary axis line C2 of the lead screw 2 is inserted into the through-hole 9a.

The second shaft holding section 11 is a member with a U-shaped cross section, and extends from the lens holding section 5 to an outside of the lens holding section 5 as mentioned above. Then, the second guide shaft 10 extending in parallel with the rotary axis line C2 of the lead screw 2 is inserted into an inner periphery 11a of the U-shaped portion of the second shaft holding section 11. It should be noted that the movement of the follower section 3 along the lead screw 2 is made stable by the first guide shaft 8 and second guide shaft 10.

Figure 2:
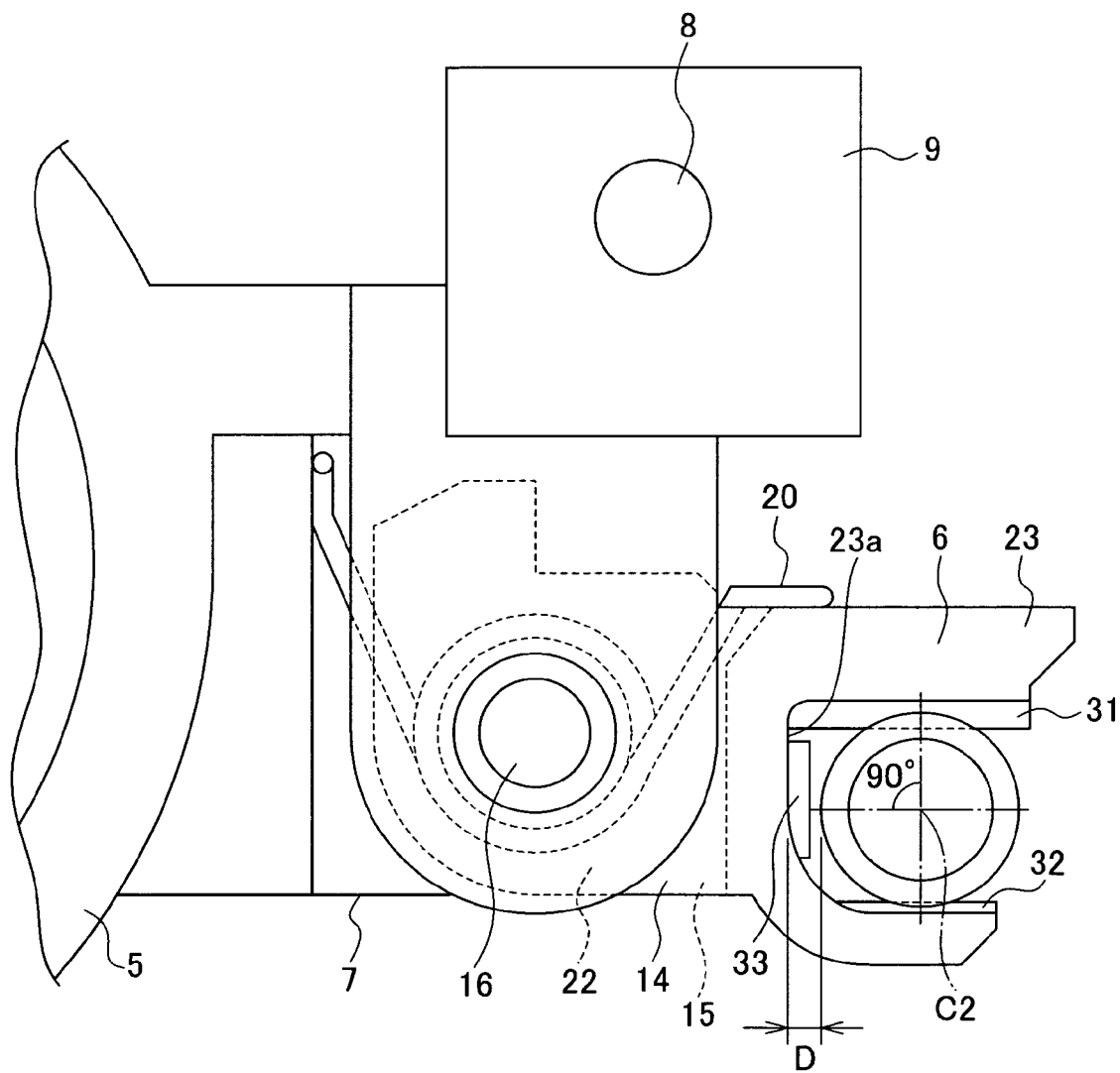
FIG. 2 is a view showing a coupling section and an arm section as viewed in the direction of the arrow II in FIG. 1.
Figure 3:
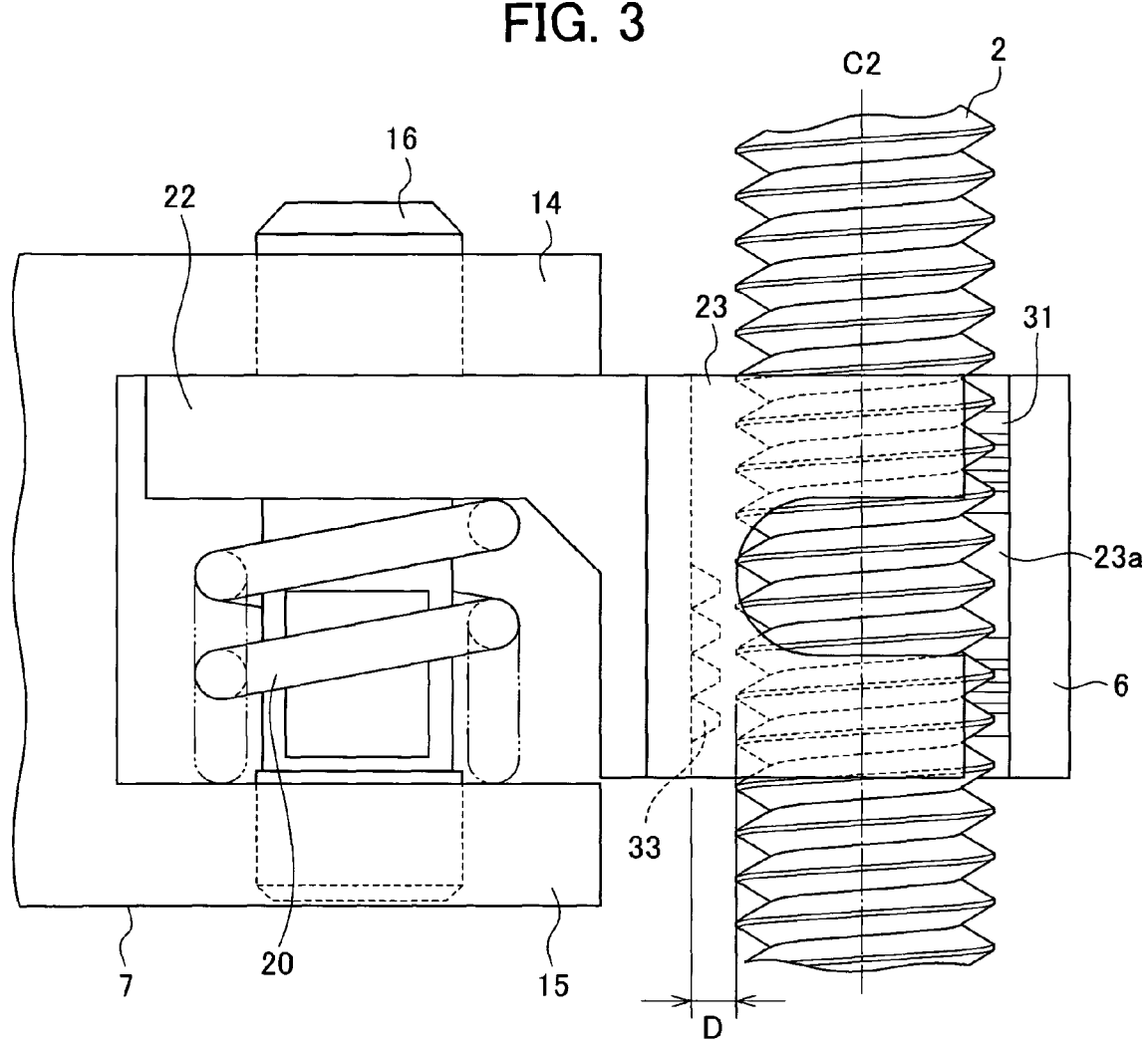
FIG. 3 is a view showing a coupling section and an arm section as viewed in the direction of the arrow III in FIG. 1.

FIG. 2 is a view of the coupling section 7 and the arm section 6 as viewed in the direction of the arrow II in FIG. 1, and FIG. 3 is a view of the coupling section 7 and the arm section 6 in the direction of the arrow III in FIG. 1. As shown, the coupling section 7 is a part extending from a cylindrical side wall of the lens holding section 5 (shown in FIG. 2) toward the lead screw 2. A portion of the coupling section 7 on a side of the lead screw 2 is divided into two-pronged portions in a direction along the rotary axis line C2 of the lead screw 2 as shown in FIG. 3, which constitute a first opposed section 14 and a second opposed section 15, respectively. Furthermore, the coupling section 7 is provided with a coupling shaft 16 penetrating the first opposed section 14 and the second opposed section 15. A biasing spring 20 is inserted in between the first opposed section 14 and the second opposed section 15 around the coupling shaft 16. In addition, a basal portion 22 of the arm section 6 is inserted on a side of the first opposed section 14 of the biasing spring 20 around the coupling shaft 16.

The arm section 6 is provided with a basal section 22 into which the coupling shaft 16 is inserted in between the first opposed section 14 and the second opposed section 15 as described above, and a U-shaped portion 23 extending from the basal portion 22 to a side of the lead screw 2.

An inner-peripheral surface 23a of the U-shaped portion 23 is provided with first teeth 31 provided on one of side portions of the lead screw 2 and second teeth 32 provided on an opposite side of the first teeth 31 across the lead screw 2. The inner-peripheral surface 23a is further provided with third teeth 33 that are about 90 degrees apart from the first teeth 31 about the rotary axis line C2 of the lead screw 2 and are placed on a lens side in a side portion of the lead screw 2.

Figure 4:
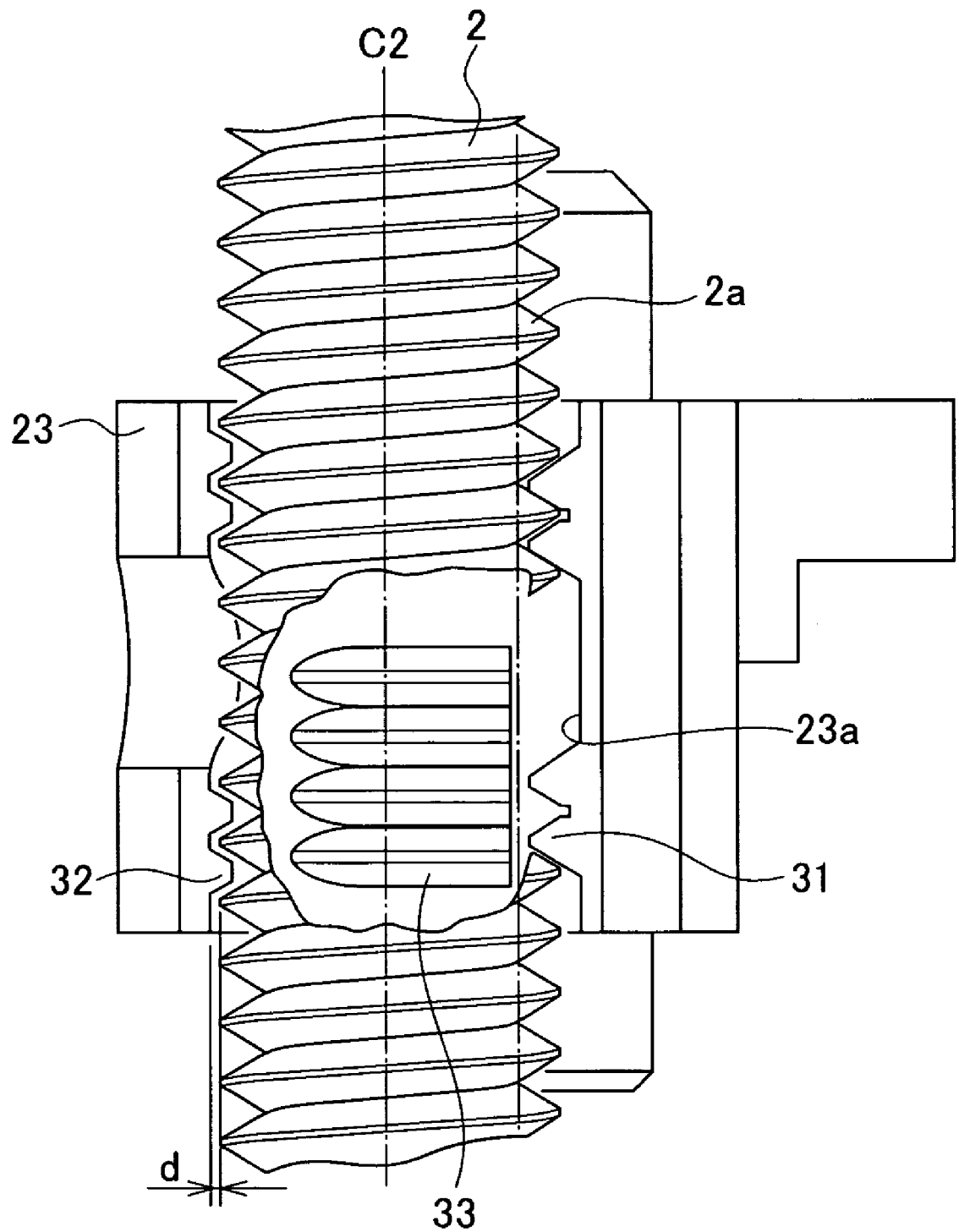
FIG. 4 is a view showing a lens driving apparatus during a normal operation as viewed in the direction of the arrow IV shown in FIG. 1.

As shown in FIGS. 1 and 2, the first teeth 31 are provided at one part of the inner-peripheral surface 23a of the U-shaped section 23 in such a manner that the teeth 31 are in meshing engagement with the threads 2a of the lead screw 2. Further, as shown in FIG. 2, it should be noted that the first teeth 31 do not form a curve along the outer-peripheral shape of the lead screw 2, but are provided on a flat surface of a rack so that the surface has a form as obtained by developing a side face of a screw. FIG. 4 is a view of the lens driving apparatus as viewed in the direction of the arrow IV shown in FIG. 1 during a normal operation, in which a part of the lead screw 2 is cut out, and the third teeth 33 are shown. It should be noted that a normal operation of the lens driving apparatus 1 means a state in which the follower section 3 is rectilinearly moved by the rotation of the lead screw 2 and in which no shock is applied to the camera and jamming or the like does not occur between the lead screw 2 and the teeth. As shown in FIG. 4, the first teeth 31 are configured to provide two threads for each of two locations along the rotary axis line C2 of the lead screw 2 on an inner-peripheral surface 23a of the U-shaped section 23, and there are no teeth between these locations. Additionally, the first teeth 31 are brought into contact with the lead screw 2 and engaged with the threads 2a in a normal operation.

The second teeth 32 are provided on an opposite side of the first teeth 31 on the inner-peripheral surface 23a of the U-shaped section 23 as shown in FIGS. 1, 2 and 4. The second teeth 32 are also not made curved along the outer-peripheral shape of the lead screw 2 as shown in FIG. 2, but are provided on a flat surface of a rack so that the surface have a form as obtained by developing a side face of a screw. As shown in FIG. 4, the second teeth 32 are also configured to provide two threads for each of two locations along the rotary axis line C2 of the lead screw 2 on an inner-peripheral surface 23a of the U-shaped section 23 as shown in FIG. 4, and there are no teeth between these locations. However, unlike the first teeth 31, there is a clearance d between a portion of a root of the second tooth 32 and a thread top of the thread 2a of the lead screw 2 in a normal condition, and the second teeth 32 and the threads 2a of the lead screw 2 are in a state of non-contact with each other in a normal operation. It should be noted that a height of the second teeth 32 is 0.1 mm and the clearance d is 0.04 mm in the present embodiment.

The third teeth 33 are provided on the inner-peripheral surface 23a of the U-shaped section 23 substantially 90 degrees apart from the first teeth 31 about the rotary axis line C2 of the lead screw 2 as shown in FIGS. 2 and 3. It should be noted that the third teeth 33 are also not made curved along an outer-peripheral shape of the lead screw 2 as shown in FIG. 2 but are provided on a flat surface of a rack so that the surface have a form as obtained by developing a side face of a screw. As shown in FIG. 3, the third teeth 33 are provided at one side (a lower side in FIG. 3) of the inner-peripheral surface 23a of the U-shaped section 23, and there are no third teeth 33 in a portion of the other side (upper side in FIG. 3) of the inner-peripheral surface 23a of the U-shaped section 23. In addition, as shown in FIGS. 2 and 3, there is a much greater clearance D between the third teeth 33 and the threads 2a than the clearance d between the second teeth 32 and the lead screw 2 during a normal operation, and the third teeth 33 and the threads 2a are in a state of non-contact with each other. It is noted that a height of the third teeth 33 is 0.19 mm and the clearance D is 0.3 mm in the present embodiment.

One end of the biasing spring 20 which is spirally wound, as shown in FIGS. 2 and 3, extends to a rear side of the portion in which the first teeth 31 in the U-shaped portion 23 are provided, and by pressing the U-shaped portion 23 toward a side of the lead screw 2, presses the first teeth 31 in such a direction that the first teeth 31 are brought into butt-contact with the lead screw 2. This pressing causes the first teeth 31 to be surely engaged with the threads 2a.

Figure 5:
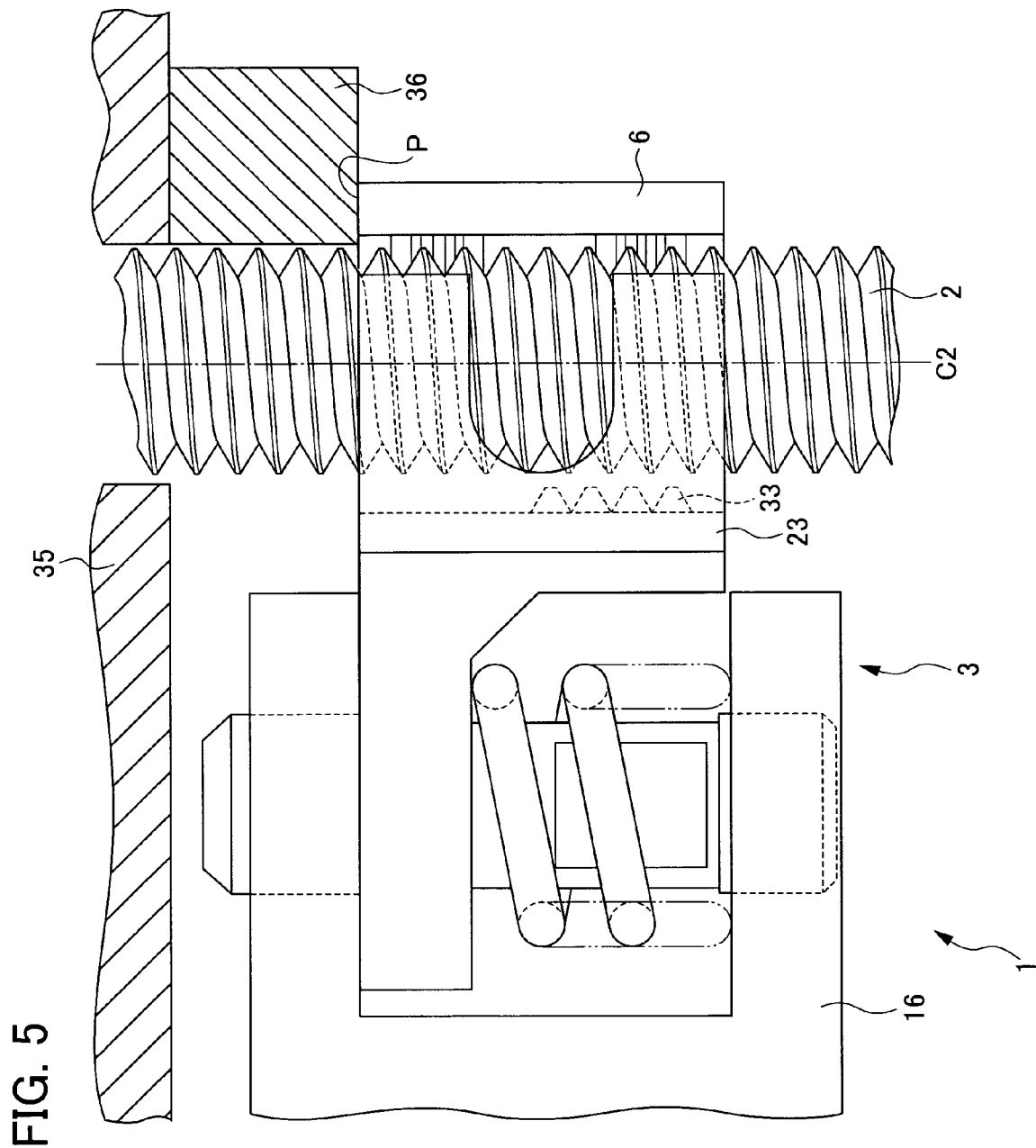
FIG. 5 is an illustration showing an end portion of a lens driving apparatus in the direction of the arrow B shown in FIG. 1.

FIG. 5 is an illustration showing an end portion of the lens driving apparatus 1, which has been advanced in the direction of the arrow B shown in FIG. 1. As shown in the figure, the lens driving apparatus 1 comprises a butt-contact section 36 fixed, for example, on a CCD platform securing a CCD or on a stationary part 35 of a stationary tube, which do not move during the AF operation using the lead screw 2. The butt-contact section 36 is a rectangular member extending from the stationary part 35 to the lens driving apparatus side, and comes into butt-contact with the U-shaped section 23 when the follower section 3 rectilinearly moves to a side of the stationary part 35 along the lead screw 2, so as to add a limitation to the follower section to prevent it from further moving in the traveling direction.

This butt-contact section 36 is provided to be brought into butt-contact with a point P that is situated on the other side (the upper side in FIG. 3), i.e., opposite to the side on which the third teeth 33 are provided and further, is situated on a side (the right side in FIG. 3) opposite to the third teeth 33 with respect to the rotary axis line C2.

The operation will now be explained. In the situation shown in FIGS. 1 to 4, since the biasing spring 20 presses the U-shaped section 23 toward a side of the lead screw 2 from the outside, the first teeth 31 are pressed in such a direction that the teeth 31 are brought into butt-contact with the lead screw 2. For this reason, the first teeth 31 are surely engaged with the threads 2a, and the clearance d occurs between the second teeth 32 and the threads of the lead screw 2 as described above. In this situation, if the lead screw 2 rotates, then the follower section 3 rectilinearly moves along the lead screw 2 based on the meshing engagement between the first teeth 31 and the threads 2a. In this case, since the biasing spring 20 presses against the first teeth 31, the first teeth 31 are surely engaged with the threads 2a, and the follower section 3 can rectilinearly move along the lead screw 2 without the occurrence of tooth skipping or the like unless an overload is applied to the section 3.

Figure 6:
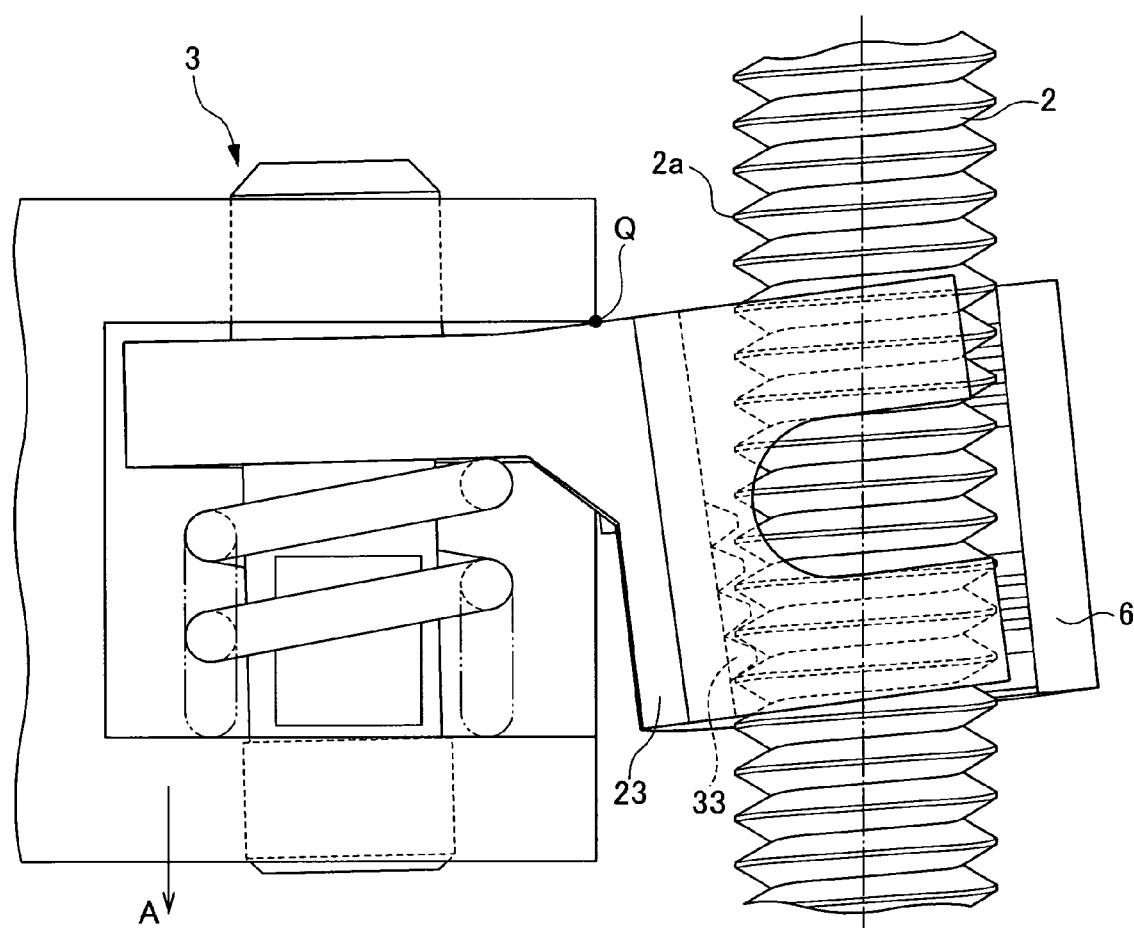
FIG. 6 is an illustration showing the case where a camera falls and shock is applied to a lens holding section in the direction of the arrow A shown in FIG. 1.

FIG. 6 is an illustration showing a case, for example, where the camera falls so that a shock is applied to the follower section 3 in the direction of the arrow A shown in FIG. 1. If the shock is applied, a force is exerted on the follower section 3 in the direction of the arrow A due to inertia. However, since the first teeth 31 of the U-shaped section 23 of the follower section 3 are in meshing engagement with the lead screw 2, the U-shaped section 23 of the follower section 3 tends to stay at the engaged point. On the other hand, the lens holding section 5 (not shown in FIG. 6) and coupling section 7 of the follower section 3 tend to move in the direction of the arrow A due to the inertia. Because of this, the arm section 6 is inclined as in the illustration using a point Q shown in FIG. 6 as a fulcrum. The inclination causes the first teeth 31 to be disengaged from the threads 2a of the lead screw 2. However, the third teeth 33 that were not engaged with the threads 2a of the lead screw 2 in normal operation are brought into engagement with the threads 2a because the arm section 6 is inclined. This engagement between the third teeth 33 and the threads 2a leads to the avoidance of tooth skip of the follower section 3 with respect to the lead screw 2.

When a camera was actually subjected to a fall and it was determined whether or not the tooth skipping occurred, tooth skipping occurred even if the camera was subjected to a fall from a height of about 2 cm in the absence of the third teeth 33. On the contrary, in the case of the camera having the lens driving apparatus of the present embodiment, which is equipped with the third teeth 33, no tooth skip occurred even if it was subjected to a fall from a height of about 40 cm.

It should be noted that the shock due to the fall is absorbed by virtue of a spring force of the spiral portion of the biasing spring 20 put inserted into the coupling shaft 16 when the camera falls down in the direction (shown by the arrow B in FIG. 1) opposed to the arrow A, for example, so that the inertial potential exerted on the follower section 3 is cushioned, thus offering a sufficient effect of preventing tooth skipping.

Next, an explanation will be given regarding the case where the follower section 3 reaches an end of the lead screw 2. As shown in FIG. 5, when the follower section 3 moves to an end of the lead screw 2, the point P of the follower section 3, shown in FIG. 5, is brought into butt-contact with the butt-contact section 36. In normal operation, a sensor or encoder not shown, detects the follower section 3 reaching the end of the lead screw 2, and thereby the rotation of the lead screw 2 is halted. However, there may be a case in which the lead screw 2 continues to rotate for some reason. Even in this case, according to the present embodiment, the butt-contact section 36 forces the point P of the follower section 3 down, so that the arm section 6 is not inclined. In this case, the lead screw 2 spins free, but there is the clearance d shown in FIG. 4 between the threads 2a of the lead screw 2 and the second teeth 32, whereby tooth skipping occurs and any excessive jamming does not occur in the first teeth 31. It should be noted that when tooth skipping occurs in this position, idle running of the motor or the like is detected, and a restoration operation can be carried out.

Figure 7:
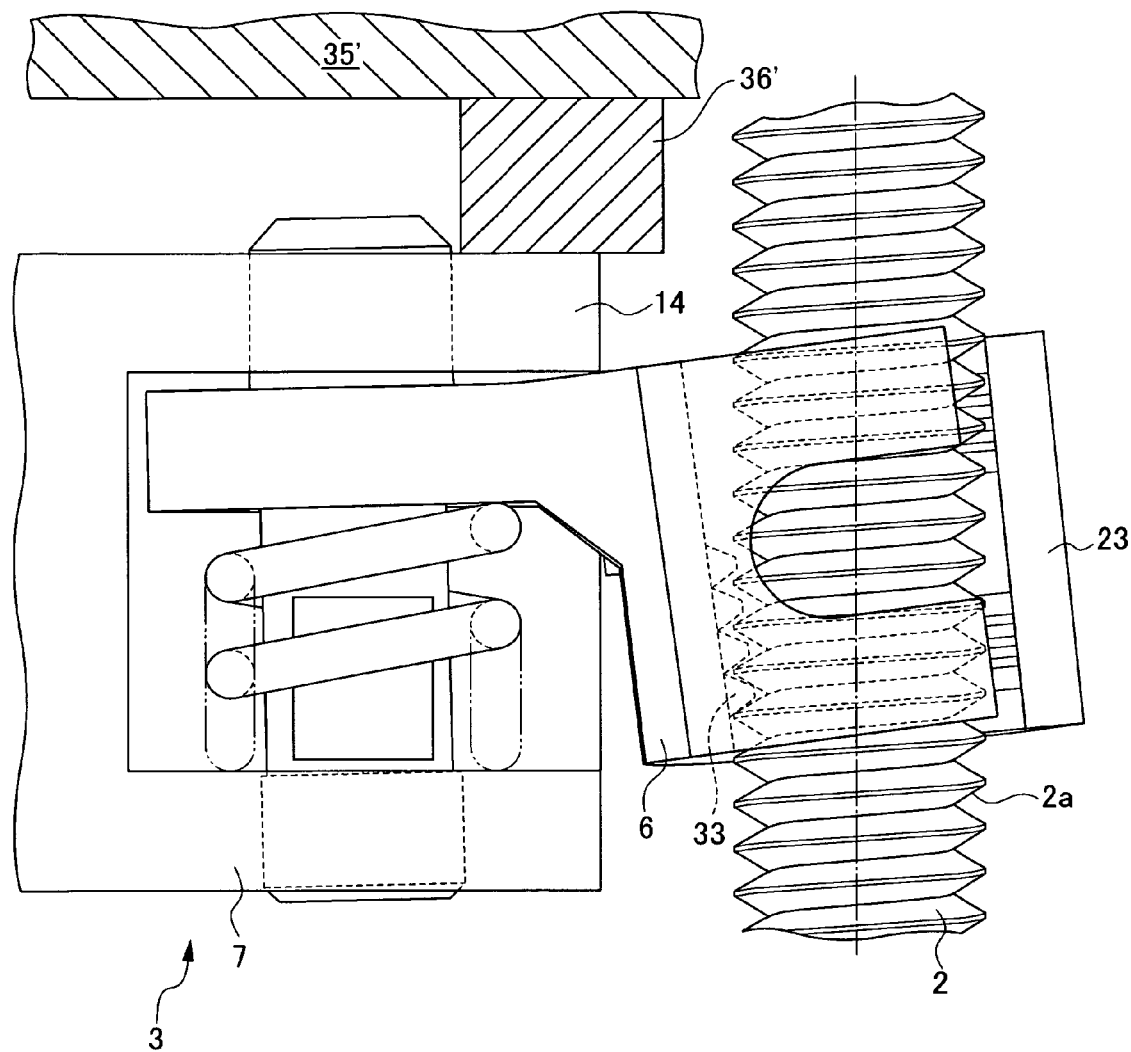
FIG. 7 is an illustration showing a comparison with FIG. 5 in which a butt-contact section is provided in a position different from that of FIG. 5.

Herein, a comparison example with respect to FIG. 5 is shown in FIG. 7. FIG. 7 is an illustration showing one end portion of the lead screw 2 in a forward direction in the lens driving apparatus 1 in a similar manner to FIG. 5. A difference from FIG. 5 is that the butt-contact section 36' provided on a stationary part 35' is provided to be brought into butt-contact with the first opposed section 14 of the coupling section 7 in the follower section 3 instead of the arm section 6 in the follower section 3. In the case of the structure shown in FIG. 6, if the follower section 3 moves to the end of the lead screw 2, then the first opposed section 14 and the butt-contact section 36' come into butt-contact with each other. In this situation, if the lead screw 2 continues to spin, then the U-shaped section 23 tends to move along the lead screw 2, so that the arm section 6 is adversely inclined. If the arm section 6 is inclined, then the third teeth 33 are engaged with the threads 2a of the lead screw 2, and in this engagement condition, the lead screw 2 continues to spin, so that the jamming can be caused.

(Modification)

The present invention is not limited to the embodiment described in the foregoing, and various modifications and/or variations thereof are possible, and they are also within the scope of the present invention.

(1) In the present embodiment, the first teeth 31, the second teeth 32, the third teeth 33 are provided on an inner-peripheral surface 23a of the single U-shaped section 23, but the invention is not limited to this manner, and these teeth may be provided at members that are each separate from each other.

(2) In the present embodiment, the respective two threads of the first teeth 31 and the second teeth 32 are provided at two locations along the rotary axis line C2 of the lead screw 2 and there are no teeth between the locations. However, the invention is not limited to this, and the first teeth 31 and the second teeth 32 may be arranged continuously on the inner-peripheral surface 23a.

(3) In the present embodiment, the biasing spring 20 is used as a biasing member, but the invention is not limited to this, and another biasing member may be used as far as it has the function of pressing the first teeth 31.

(4) In the present embodiment, the butt-contact section 36 is provided on an end face portion of the lens driving apparatus 1, such as a CCD platform, but the invention is not limited to this, and the section 36 may be provided on another portion so far as the portion is capable of preventing inclination of the arm section 6. In addition, in the present embodiment, the butt-contact section 36 is constructed of a rectangular member, but the invention is not limited to this, and it may be constructed of a pin or an elastic member.

(5) In the present embodiment, the follower section 3 has a structure constituted of two members, one of which is the arm section 6 and another of which is a member comprising the coupling section 7 and the lens holding section 5 other than the arm section 6, but the present invention is not limited to this, and the follower section 3 may be constituted of three or more members and may be constituted of a single member.

What is claimed is:

1. A driving apparatus, comprising:
   a lead screw rotating about a rotational axis line to transfer a driving force;
   a first tooth disposed to face a first circumferential portion of the lead screw;
   a second tooth disposed to face a second circumferential portion of the lead screw, the second circumferential portion being opposite to the first circumferential portion with respect to the rotational axis line of the lead screw, such that the first tooth and the second tooth are opposite to each other;
   a third tooth disposed to face a third circumferential portion of the lead screw, a diameter passing through the third circumferential portion being oriented perpendicular to a diameter passing through the first circumferential portion and the second circumferential portion;
   a follower section holding a driven member and moving when the follower section is driven by the rotation of the lead screw; and
   a biasing member biasing the first tooth such that the first tooth approaches the lead screw,
   wherein the first tooth engages with the lead screw so as to receive the driving force from the lead screw, when the follower section moves due to the rotation of the lead screw.

2. The driving apparatus according to claim 1, wherein the biasing member biases the second tooth such that the second tooth departs away from the lead screw.

3. The driving apparatus according to claim 2, wherein, when the follower section moves due to the rotation of the lead screw, the second tooth engages with the lead screw more loosely than the first tooth and the third tooth does not engage with the lead screw.

4. The driving apparatus according to claim 3, wherein
   the second tooth is disposed 180 degrees offset from the first tooth in a circumferential direction with respect to the rotational axis line of the lead screw, and
   the third tooth is disposed 90 degrees offset from the first tooth in the circumferential direction with respect to the rotational axis line of the lead screw.

5. The driving apparatus according to claim 1, wherein the third tooth is provided at a position closer to the driven member than the first tooth and the second tooth.

6. The driving apparatus according to claim 1, wherein
   the follower section has an inner-peripheral surface surrounding circumferential portions of the lead screw such that a part of the circumferential portions is exposed, and
   the first tooth, the second tooth and the third tooth are formed on the inner-peripheral surface, the third tooth being disposed at an offset position in a direction of the rotational axis line of the lead screw.

7. The driving apparatus according to claim 1, further comprising a stationary part that does not move when the lead screw drives the driven member, wherein
   a butt-contact section is provided on the stationary part, and the follower section is restricted from moving along the lead screw when the follower section comes into contact with the butt-contact section at an end of a movable range of the follower section.

8. The driving apparatus according to claim 6, further comprising a stationary part that does not move when the lead screw drives the driven member, wherein
   a butt-contact section is provided on the stationary part, the butt-contact section being disposed opposite to the offset position of the third tooth in the direction of the rotational axis line of the lead screw and across the rotational axis line of the lead screw, and
   the follower section is restricted from moving along the lead screw when the follower section comes into contact with the butt-contact section at an end of a movable range of the follower section.

9. The driving apparatus according to claim 1, wherein the driving apparatus is employed in a lens barrel to drive a lens.

10. The driving apparatus according to claim 1, wherein the driving apparatus is employed in a camera to drive a lens.

11. The driving apparatus according to claim 1, wherein, when an impact acts on the follower section in the direction of the rotational axis line, the first tooth disengages with the lead screw and the third tooth engages with the lead screw.

12. The driving apparatus according to claim 1, wherein
    the follower section comprises an arm unit that includes a first arm provided with the first tooth and a second arm provided with the second tooth, and
    a thickness of the first arm is greater than a thickness of the second arm.

13. A driving apparatus, comprising:
    a lead screw rotating about a rotational axis line to transfer a driving force;
    a first tooth disposed to face a first circumferential portion of the lead screw;
    a second tooth disposed to face a second circumferential portion of the lead screw, the second circumferential portion being opposite to the first circumferential portion with respect to the rotational axis line of the lead screw such that the first tooth and the second tooth are opposite to each other;
    a third tooth disposed to face a third circumferential portion of the lead screw, a diameter passing through the third circumferential portion being oriented perpendicular to a diameter passing through the first circumferential portion and the second circumferential portion; and
    a follower section holding a driven member and moving when the follower section is driven by the rotation of the lead screw,
    wherein, when the follower section moves due to the rotation of the lead screw, the second tooth and the third tooth are free of contact with the lead screw and the first tooth engages with the lead screw so as to receive the driving force from the lead screw.

14. A driving apparatus, comprising:
    a lead screw rotating about a rotational axis line to transfer a driving force;
    a first tooth disposed to face a first circumferential portion of the lead screw;
    a second tooth disposed to face a second circumferential portion of the lead screw, the second circumferential portion being opposite to the first circumferential portion with respect to the rotational axis line of the lead screw such that the first tooth and the second tooth are opposite to each other;
    a third tooth disposed to face a third circumferential portion of the lead screw, a diameter passing through the third circumferential portion being oriented perpendicular to a diameter passing through the first circumferential portion and the second circumferential portion; and a follower section holding a driven member and moving when the follower section is driven by the rotation of the lead screw, wherein, when the follower section moves due to the rotation of the lead screw, the first tooth engages with the lead screw so as to receive the driving force from the lead screw, the second tooth engages with the lead screw more loosely than the first tooth and the third tooth does not engage with the lead screw.

15. A driving apparatus, comprising:

a lead screw rotating about a rotational axis line to transfer a driving force;

a first tooth disposed to face a first circumferential portion of the lead screw;

a second tooth disposed to face a second circumferential portion of the lead screw, the second circumferential portion being opposite to the first circumferential portion with respect to the rotational axis line of the lead screw, such that the first tooth and the second tooth are opposite to each other;

a third tooth disposed to face a third circumferential portion of the lead screw, a diameter passing through the third circumferential portion being oriented cross to a diameter passing through the first circumferential portion;

a follower section holding a driven member and moving when the follower section is driven by the rotation of the lead screw; and a biasing member biasing the first tooth such that the first tooth approaches the lead screw, wherein the first tooth engages with the lead screw so as to receive the driving force from the lead screw, when the follower section moves due to the rotation of the lead screw.

16. A driving apparatus, comprising:

a lead screw rotating about a rotational axis line to transfer a driving force;

a first tooth disposed to face a first circumferential portion of the lead screw;

a second tooth disposed to face a second circumferential portion of the lead screw, the second circumferential portion being opposite to the first circumferential portion with respect to the rotational axis line of the lead screw such that the first tooth and the second tooth are opposite to each other;

a third tooth disposed to face a third circumferential portion of the lead screw, a diameter passing through the third circumferential portion being oriented cross to a diameter passing through the first circumferential portion; and a follower section holding a driven member and moving when the follower section is driven by the rotation of the lead screw, wherein, when the follower section moves due to the rotation of the lead screw, the second tooth and the third tooth are free of contact with the lead screw and the first tooth engages with the lead screw so as to receive the driving force from the lead screw.

17. A driving apparatus, comprising:

a lead screw rotating about a rotational axis line to transfer a driving force;

a first tooth disposed to face a first circumferential portion of the lead screw;

a second tooth disposed to face a second circumferential portion of the lead screw, the second circumferential portion being opposite to the first circumferential portion with respect to the rotational axis line of the lead screw such that the first tooth and the second tooth are opposite to each other;

a third tooth disposed to face a third circumferential portion of the lead screw, a diameter passing through the third circumferential portion being oriented cross to a diameter passing through the first circumferential portion; and a follower section holding a driven member and moving when the follower section is driven by the rotation of the lead screw, wherein, when the follower section moves due to the rotation of the lead screw, the first tooth engages with the lead screw so as to receive the driving force from the lead screw, the second tooth engages with the lead screw more loosely than the first tooth and the third tooth does not engage with the lead screw.

* * * * *